United States Patent
Khan et al.

(10) Patent No.: US 10,837,778 B2
(45) Date of Patent: Nov. 17, 2020

(54) LARGE-DYNAMIC-RANGE FIBER OPTIC GYROSCOPE

(71) Applicant: Nufern, East Granby, CT (US)

(72) Inventors: Jan Amir Khan, Windsor, CT (US);
David Paquette, Woodstock, CT (US)

(73) Assignee: Nufern, East Granby, CT (US)

( * ) Notice: Subject to any disclaimer, the term of this patent is extended or adjusted under 35 U.S.C. 154(b) by 0 days.

(21) Appl. No.: 16/383,106

(22) Filed: Apr. 12, 2019

(65) Prior Publication Data

US 2019/0316907 A1    Oct. 17, 2019

Related U.S. Application Data

(60) Provisional application No. 62/656,590, filed on Apr. 12, 2018.

(51) Int. Cl.
*G01C 19/72* (2006.01)

(52) U.S. Cl.
CPC ......... *G01C 19/726* (2013.01); *G01C 19/721* (2013.01)

(58) Field of Classification Search
CPC ..... G01C 19/72; G01C 19/721; G01C 19/726
See application file for complete search history.

(56) References Cited

U.S. PATENT DOCUMENTS

| | | | |
|---|---|---|---|
| 4,969,017 A | 11/1990 | Lefevre et al. | |
| 5,345,307 A * | 9/1994 | Ishigami | G01C 19/726 356/464 |
| 5,953,123 A * | 9/1999 | Jaklitsch | G01C 19/726 356/464 |
| 7,187,448 B2 | 3/2007 | Lehureau | |
| 2007/0121116 A1* | 5/2007 | Greening | G01C 19/726 356/460 |
| 2012/0283969 A1 | 11/2012 | Bohnert et al. | |

FOREIGN PATENT DOCUMENTS

EP    1790944 A2    5/2007

OTHER PUBLICATIONS

International Search Report and Written Opinion received for PCT Patent Application No. PCT/US2019/027164, dated Nov. 14, 2019, 19 pages.
Invitation to Pay Addition Fees received for PCT Patent Application No. PCT/US2019/027164, dated Aug. 1, 2019, 10 pages.

* cited by examiner

*Primary Examiner* — Jonathan M Hansen
(74) *Attorney, Agent, or Firm* — Morrison & Foerster LLP (57) ABSTRACT

A method for operating a fiber optic gyroscope to measure angular velocity uses a closed-loop modulation scheme. Two-state modulation voltages are applied to an optical modulator and continuously adjusted to maintain a null difference between corresponding demodulated voltages from a photodetector. If one of the modulation voltages reaches a threshold voltage, the continuous nulling adjustment is interrupted briefly while the two-state modulation voltages are reset to values that correspond to relative phases of $\pi/2$ and $-\pi/2$ when the gyroscope is stationary, then the continuous adjustment is resumed. This reoccurring resetting, while the gyroscope accelerates or decelerates, substantially increases the dynamic range over which the gyroscope can precisely measure angular velocity.

19 Claims, 6 Drawing Sheets

LARGE-DYNAMIC-RANGE FIBER OPTIC GYROSCOPE

PRIORITY

This application claims priority to U.S. Provisional Application Ser. No. 62/656,590 filed Apr. 12, 2018, the disclosure of which is incorporated herein by reference in its entirety.

TECHNICAL FIELD OF THE INVENTION

The present invention relates in general to operation of a fiber optic gyroscope for measuring rotation rate. The invention relates in particular to operation of a fiber optic gyroscope over a large dynamic range of rotation rates.

DISCUSSION OF BACKGROUND ART

Traditional mechanical gyroscopes are built around a disc-shaped mass rotating about an axis in a gimbal mount. The axis of rotation is inertial, due to conservation of angular momentum, and orientation is measured with respect to this inertial axis of rotation. In modern applications, these mechanical gyroscopes have been replaced by ring-laser gyroscopes that use the Sagnac effect. Two counter-propagating laser beams are generated by an energized gain medium in a high-finesse ring cavity. A non-zero angular velocity produces a small difference in the time taken for each laser beam to make one complete transit of the ring cavity and a corresponding difference in their frequencies. This small frequency difference is measured inteferometrically using a tiny fraction of each laser beam that leaks from the ring cavity. Ring-laser gyroscopes directly measure angular velocity rather than angular orientation.

High-performance military and commercial applications that require precise inertial navigation utilize fiber optic gyroscopes, which also use the Sagnac effect, but measure the angular velocity of a coiled single-mode optical fiber. The Sagnac effect is enhanced by coiling hundreds or thousands of meters of optical fiber into a coil having a diameter of order 10 centimeters. A significant difference between fiber optic and other ring-laser gyroscopes is that the gain medium is outside the fiber coil. One laser beam is split into two laser beams, which are injected into each end of the fiber coil. The counter propagating laser beams are recombined after transiting through the fiber coil. The different transit times of the laser beams produce a corresponding phase difference that is measured interferometrically on a photodetector.

Numerous techniques have been developed to enhance the precision of fiber optic gyroscopes. A simple "open-loop" technique, as it is known in the gyroscope art, is to induce a $\pi/2$ phase difference between the recombined laser beams using a phase modulator, which maximizes the sensitivity of the photodetector signal to changes in angular velocity. An additional modulation can be applied to the relative phase of the laser beams to continuously compensate for changes in angular velocity, to maintain a phase difference between the interfering beams that is close to $\pi/2$, thereby maintaining optimal measurement precision.

A simple "closed-loop" technique is to induce a rapidly repeating $\pi/2$ and $-\pi/2$ modulation between the recombined laser beams and to synchronously demodulate the photodetector signal. This is called a "two-state modulation" in the art. A change in angular velocity produces a change in the difference between the two demodulated photodetector signals. Again, an additional modulation of the relative phases of the laser beams can be applied to continuously compensate for changes in angular velocity, to maintain a difference between the two demodulated signals of about zero. In these simple techniques, the additional phase modulation is proportional to the change in angular velocity. The maximum angular velocities that can be measured by these simple techniques is limited by the dynamic range of the phase modulator and the coherence of the laser beams.

More complex phase modulation techniques have been developed to measure and correct for errors that would otherwise diminish the precision of a fiber optic gyroscope. For example, to correct for variations in the intensity of the laser beam produced by the gain medium. The minimum measurement interval is limited by the Eigen-frequency of the ring coil. Any additional modulation states will extend this minimum measurement interval.

In all these techniques there is a compromise between measurement precision and maximum angular velocity, which is determined by selecting the scaling between induced phase change and applied control signal, when specifying the phase modulator and its controller. Since a fiber optic gyroscope measures angular velocity, continuous and precise integration is necessary to determine orientation. The precision of these techniques is compromised by even a momentary lapse in measured angular velocity. By way of example, a submarine maybe submerged for many weeks, relying on such continuous integration of angular velocity measured by a fiber optic gyroscope to know the submarine's orientation. Angular velocity must be measured precisely, frequently, and reliably after an initial calibration in port.

There is need for a method of operating a fiber optic gyroscope that maintains high-measurement precision over a large dynamic range between a maximum negative and maximum positive angular velocity. Preferably, this method should provide high duty-cycle angular velocity measurements with minimal interruptions, using standard gyroscope hardware.

SUMMARY OF THE INVENTION

In one aspect, a method is disclosed for operating a fiber optic gyroscope in accordance with the present invention. The fiber optic gyroscope has a source of optical radiation, a fiber coil, and a photodetector all optically coupled to a modulator. The source is energized to generate a beam of optical radiation. The modulator is arranged to divide the beam into two counter-propagating beams circulating around the fiber coil. The modulator recombines the counter-propagating beams after circulating completely around the fiber coil. The photodetector is arranged to intercept the recombined beams and to generate a photodetector voltage that is proportional to an optical power of the recombined beams interfering on the photodetector. A modulator control voltage is supplied to the modulator that changes a relative phase between the interfering beams. The modulator control voltage is adjusted continuously to maintain a target photodetector voltage, which corresponds to a selected relative phase when the gyroscope is not rotating, thereby maintaining closed-loop operation on one interference fringe of the gyroscope as the gyroscope rotates. The adjusting-continuously step is interrupted when the modulator control voltage reaches a threshold voltage. The modulator control voltage is set to a voltage that corresponds to the selected relative phase when the gyroscope is not rotating. The adjusting-continuously step is resumed, thereby resuming closed-loop operation on another interference fringe of the gyroscope.

In another aspect of the present invention, a method is disclosed for operating a fiber optic gyroscope having a source of optical radiation, a fiber coil, and a photodetector all optically coupled to a modulator. The source is energized to generate a beam of optical radiation. The modulator is arranged to divide the beam into two counter-propagating beams circulating around the fiber coil. The modulator recombines the counter-propagating beams after circulating completely around the fiber coil. The photodetector is arranged to intercept the recombined beams and to generate a photodetector voltage that is proportional to an optical power of the recombined beams interfering on the photodetector. A modulator control voltage is supplied to the modulator that changes a relative phase between the interfering beams. The modulator control voltage is modulated alternately between two modulation voltages that correspond to relative phases of $\pi/2$ and $-\pi/2$ when the gyroscope is not rotating. A common additional modulator voltage is adjusted continuously and applied to the two modulation voltages to null a difference between two corresponding demodulated photodetector voltages as the gyroscope rotates. The adjusting-continuously step is interrupted when the common additional modulator voltage reaches a threshold voltage. The common additional modulator voltage is set to zero and then the adjusting-continuously step is resumed.

BRIEF DESCRIPTION OF THE DRAWINGS

The accompanying drawings, which are incorporated in and constitute a part of the specification, schematically illustrate a preferred embodiment of the present invention, and together with the general description given above and the detailed description of the preferred embodiment given below, serve to explain principles of the present invention.

DESCRIPTION OF THE INVENTION

Figure 1:
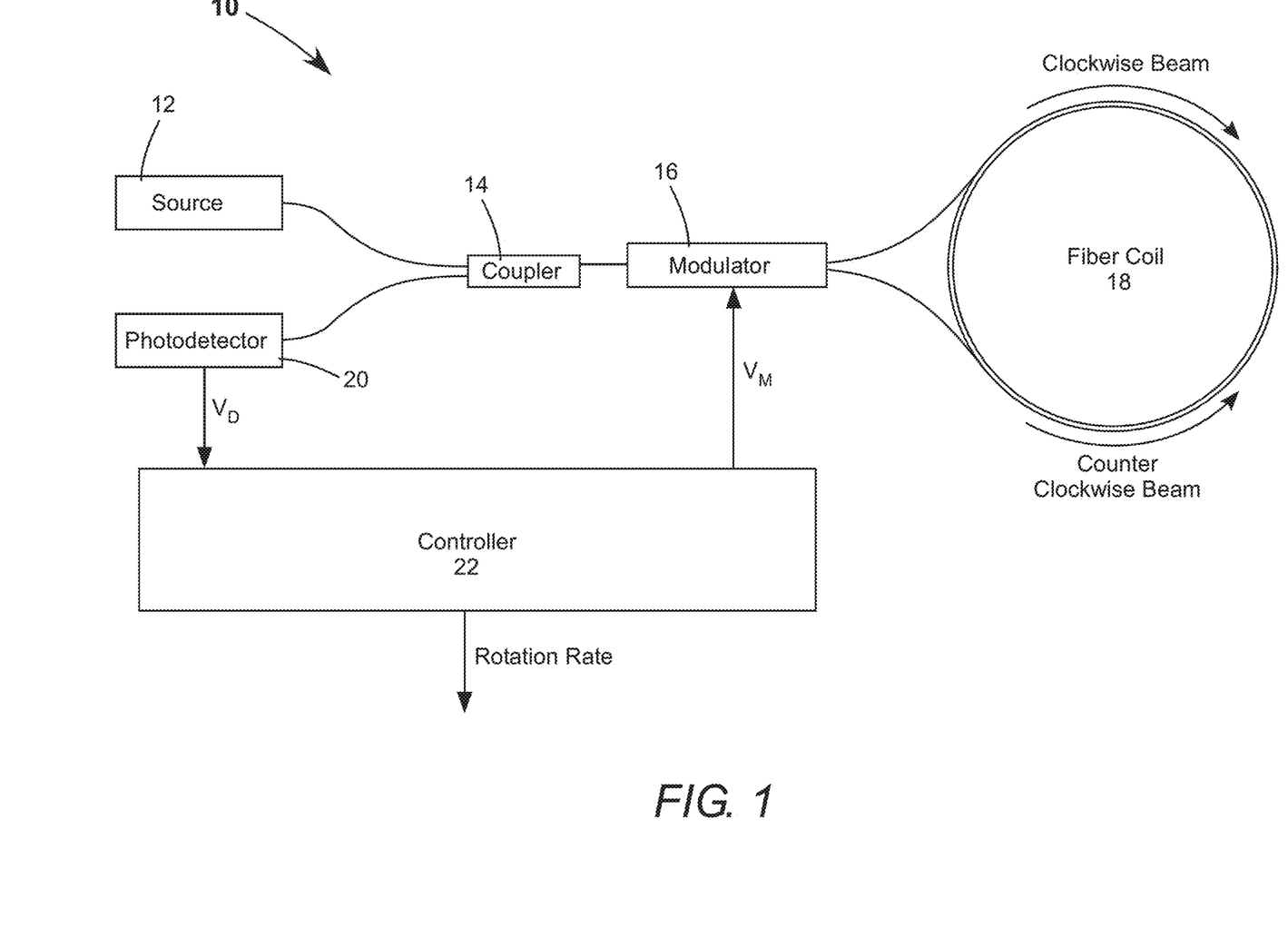
FIG. 1 schematically illustrates one preferred embodiment of fiber optic gyroscope apparatus in accordance with the present invention, including a fiber coil, a modulator, a source of optical radiation, and a photodetector.

Referring now to the drawings, wherein like components are designated by like numerals, FIG. 1 schematically illustrates one preferred embodiment of fiber optic gyroscope 10 in accordance with the present invention. A source 12 provides a beam of optical radiation through an optical coupler 14 to an optical modulator 16. Source 12, optical coupler 14, and optical modulator 16 are fiber optic components that are optically coupled by optical fibers. A fiber optic coil 18 is optically coupled at each end thereof to modulator 16. The modulator divides the beam of optical radiation into two counter-propagating beams, each counter-propagating beam circulating completely around fiber coil 18 and back into the modulator. The modulator recombines the two counter-propagating beams, which then propagate back through coupler 14 onto a photodetector 20. Photodetector 20 is optically coupled to coupler 14 by an optical fiber and intercepts the recombined beams.

Source 12 could be, for example, a laser diode generating laser radiation or a super-luminescent diode producing amplified spontaneous emission. Energized laser diodes provide single-longitudinal-mode laser-radiation having a narrow spectral bandwidth, a long coherence time, and a corresponding long coherence length. A long coherence length can be a disadvantage if there are internal reflections within the gyroscope. For example, reflections from fiber splices or from internal elements of the modulator. Energized super luminescent diodes provide broader bandwidth optical radiation having shorter coherence times and shorter coherence lengths.

Modulator 16 is an integrated optical device that both divides the optical radiation into two beams and controls the relative phase between the two beams. A modulator control voltage $V_M$ is supplied to the modulator to control the relative phase change applied to the beams as they transit in both directions through an optically non-linear crystal in the modulator. For example, a modulator having an optically non-linear crystal made of Lithium Niobate ($LiNbO_3$).

Photodetector 20 is a photodiode, for example, having a semiconductor material as the photosensitive element. The photodetector generates a signal in the form of a photodetector voltage $V_D$ that is proportional to the optical power of the recombined beams interfering on the photodetector. The photodetector voltage is received by a controller 22, which sets the modulator voltage and provides an output that is a calibrated or uncalibrated rotation rate of fiber optic gyroscope 10. Although the present invention is described herein for measuring rotation rate from a rotation-induced phase shift, due to the Sagnac effect, the inventive method could be applied to measure any phase shift of the recombined beams.

Figure 2:
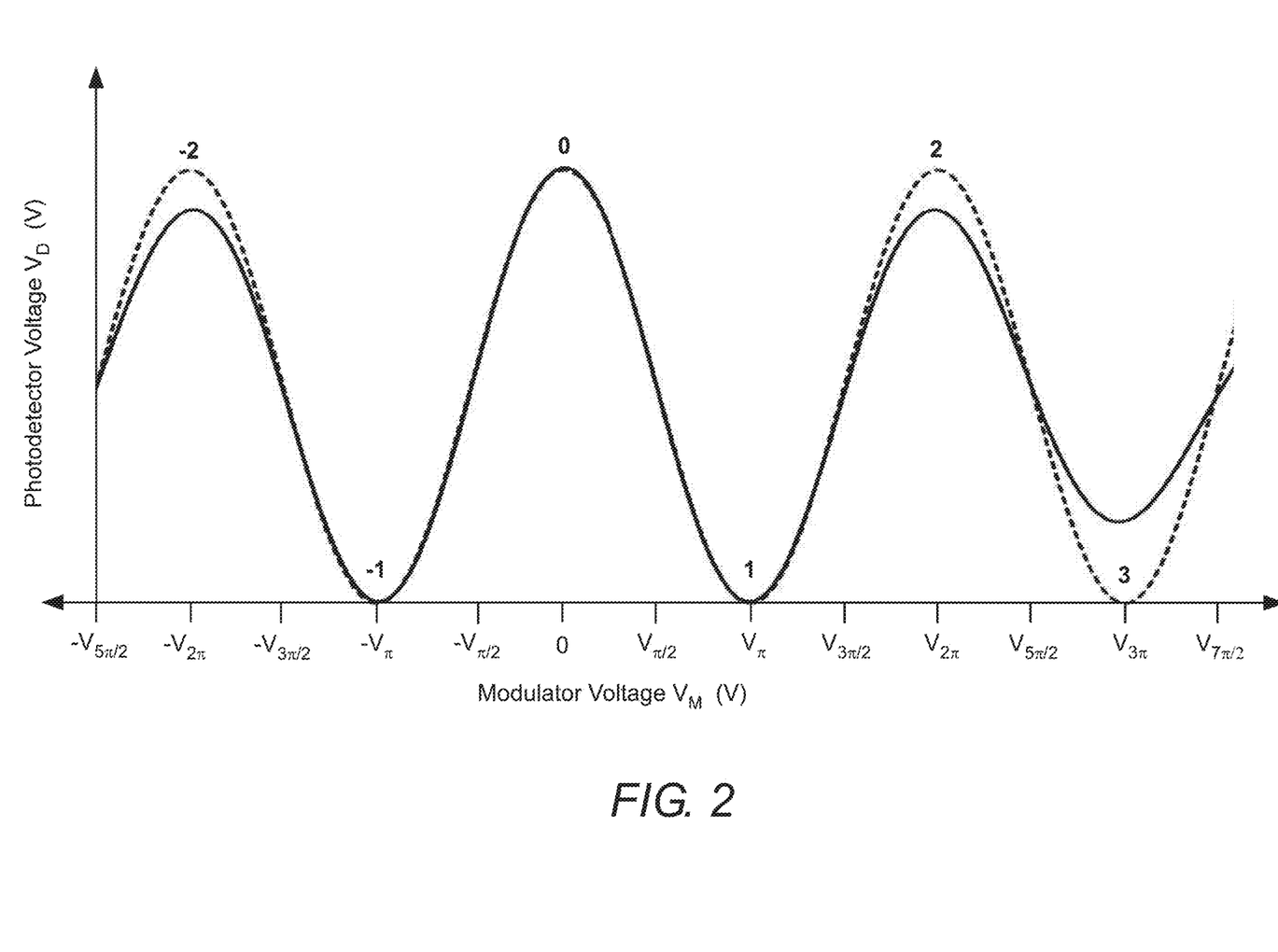
FIG. 2 is a graph schematically illustrating photodetector voltage vs. modulator voltage for the fiber optic gyroscope apparatus of FIG. 1, which is not rotating, the dashed curve for highly-coherent optical radiation and the solid curve for optical radiation having finite temporal coherence.

FIG. 2 is a graph schematically illustrating photodetector voltage vs. modulator voltage while the fiber optic gyroscope is stationary; specifically, while the fiber optic gyroscope is not rotating. In a simplest implementation of a fiber optic gyroscope, the recombined beams interfere on the photosensitive element of the photodetector, producing a characteristic sinusoidal curve, having fringes caused by constructive and destructive interference. Interference fringes are numbered from 0 in the drawing, for purposes of description, using even numbers for bright fringes and odd numbers for dark fringes. The dashed curve depicts an optical beam having a long coherence time and the solid curve represents a beam having a shorter coherence time. A shorter coherence time results in less contrast between brighter constructive and darker destructive interference fringes as the absolute modulator voltage increases. Modulator voltages on the drawing are labeled according to the corresponding phases in the interference fringes ( . . . . $-V_\pi$, $-V_{\pi/2}$, 0, $V_{\pi/2}$, $V_\pi$, . . . ).

Figure 3A:
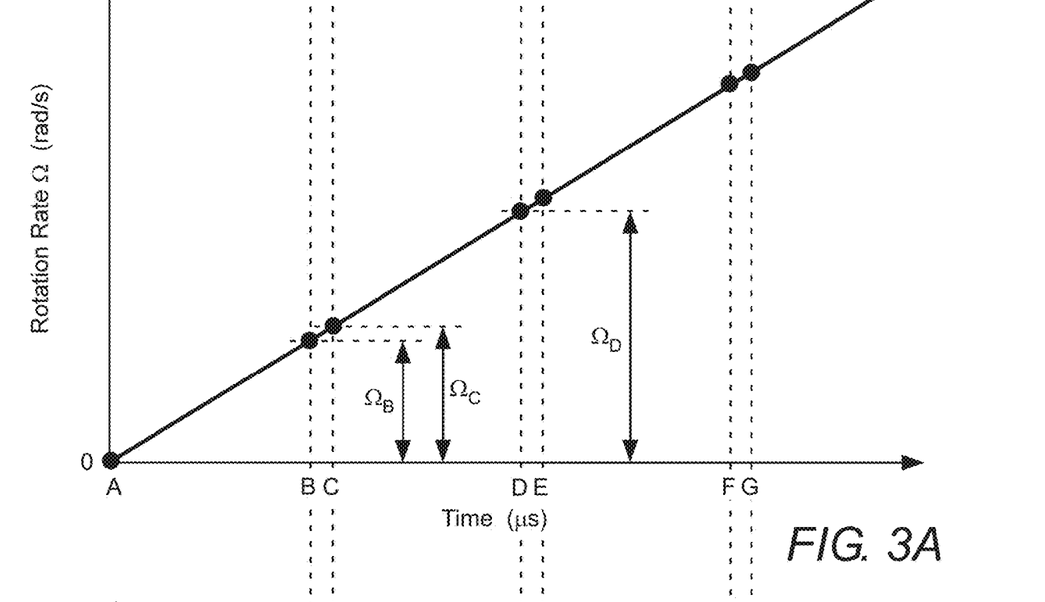
FIG. 3A and FIG. 3B form a timing diagram schematically illustrating one preferred embodiment of a method for operating a fiber optic gyroscope in accordance with the present invention, FIG. 3A depicting constant rotational acceleration, starting from a non-rotating state at time 0 μs, and FIG. 3B depicting adjustments to the modulator voltage.
Figure 3B:
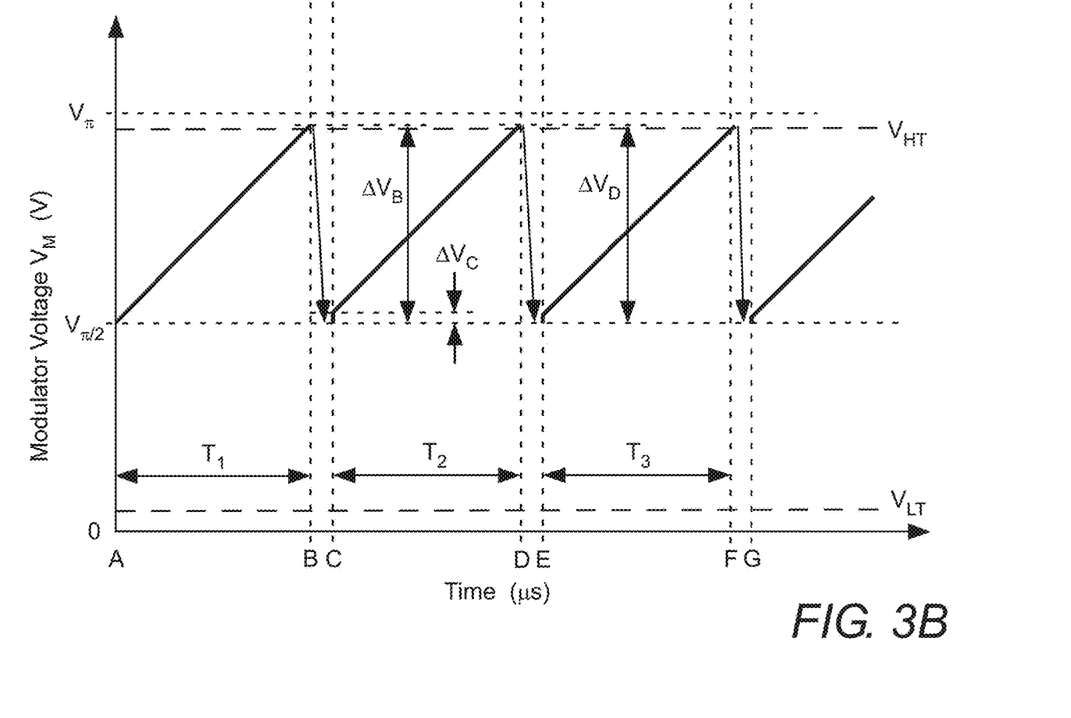

FIG. 3A is a graph schematically illustrating rotation rate vs. time for fiber optic gyroscope 10, which is initially non-rotating at time A and then constantly accelerating. At a time B, the fiber optic gyroscope has a rotational velocity of $\Omega_B$, in this example. At later times C, D, E, F, and G, the fiber optic gyroscope has rotational velocities of respectively $\Omega_C$, $\Omega_D$, $\Omega_E$, $\Omega_F$, and $\Omega_G$. FIG. 3B is a graph schematically illustrating modulator voltage vs. time for the fiber optic gyroscope. FIGS. 3A and 3B together form a timing diagram schematically illustrating one preferred embodiment of "open-loop" method for operating a fiber optic gyroscope in accordance with the present invention.

Figure 4:
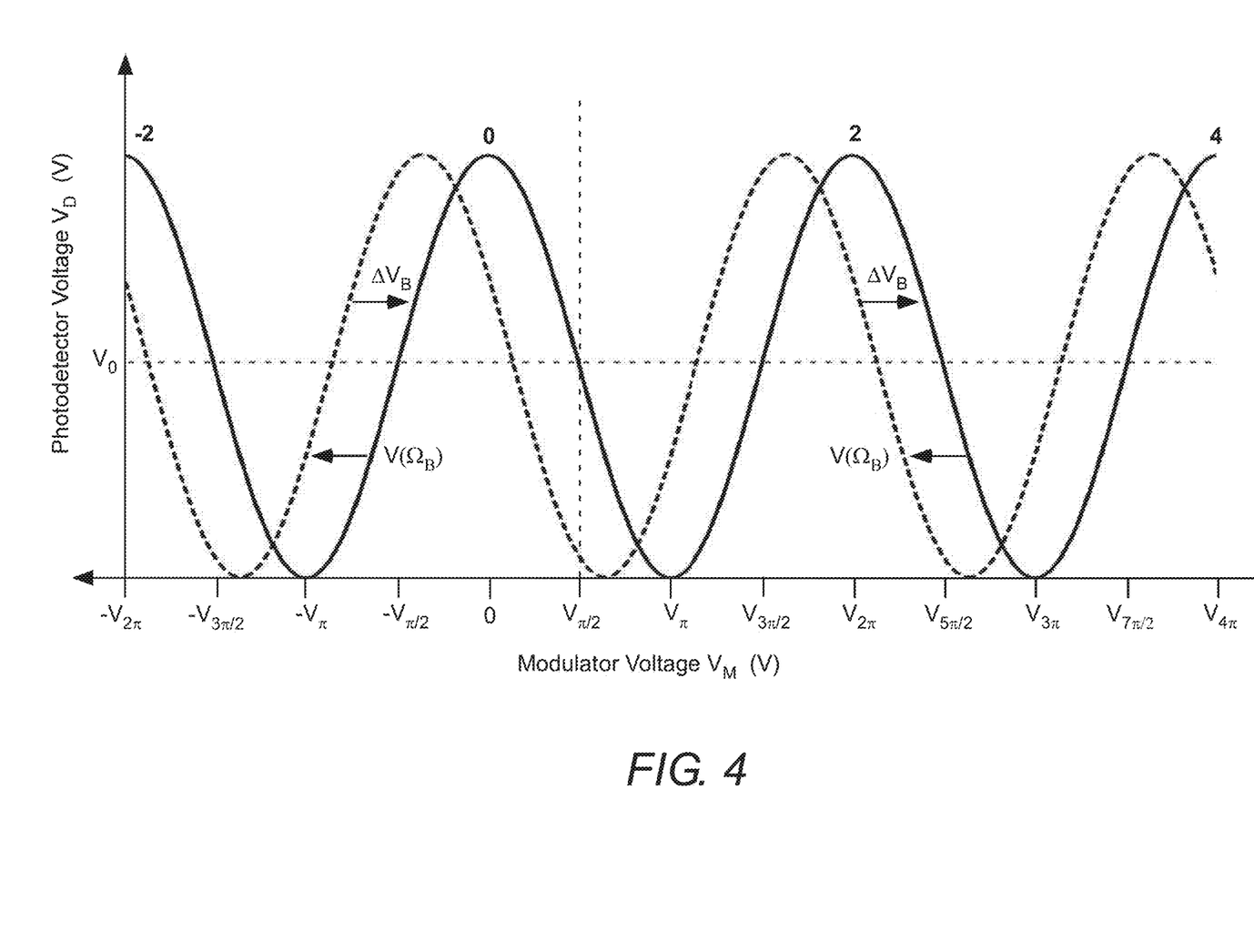
FIG. 4 is a graph schematically illustrating photodetector voltage vs. modulator voltage during operation of a fiber optic gyroscope in accordance with the method of FIGS. 3A and 3B, the solid line depicting closed-loop operation at a rotation rate $\Omega_B$.

FIG. 4 is a graph schematically illustrating photodetector voltage vs. modulator voltage during a period $T_1$ indicated on FIG. 3B. Beginning at time A, a voltage $V_{\pi/2}$ is applied to modulator 16, causing a photodetector voltage of $V_0$, as indicated by vertical and horizontal dashed lines. $V_{\pi/2}$ is a preferred voltage for operating an initially non-rotating fiber optic gyroscope for maximum sensitivity to changes in rotation rate. At time B, the fiber optic gyroscope has a rotational velocity of $\Omega_B$, which would produce a displacement of the interference fringes by a voltage $V(\Omega_B)$, represented by the dashed curve. However, an additional voltage $\Delta V_B$ is applied to the modulator to maintain a photodetector voltage of $V_0$ and thereby maintain operation on fringe 0-1.

Typically, a fiber optic gyroscope is configured to operate with a modulator voltage between 0 and $V_\pi$, using the photodetector voltage as a feedback signal and continuously adjusting the modulator voltage to maintain a target photodetector voltage of $V_0$. The additional voltage $\Delta V$ applied iteratively to the modulator is proportional to the rotation rate $\Omega$ of the fiber optic gyroscope, having a constant of proportionality determined through a calibration procedure. Rotation rates corresponding to modulator voltages between about 0 and about $V_\pi$ define the dynamic range of the gyroscope. All the electronics and control elements of the fiber optic gyroscope are scaled to operate over this dynamic range to achieve maximum sensitivity to changes in rotation rate $\Omega$ in both rotational directions.

The inventive fiber optic gyroscope has threshold modulator voltages depicted as horizontal long-dashed lines labeled $V_{HT}$ and $V_{LT}$ in FIG. 3B. In this example of constant positive acceleration, time B is the first iteration to have a modulator voltage $V_M$ exceeding a high-threshold voltage $V_{HT}$. Continuous adjustment of the modulator voltage is interrupted and the modulator voltage is rapidly set to $V_{\pi/2}$. This resetting of the modulator voltage to $V_{\pi/2}$ is represented by an arrow on the drawing between times B and C. Continuous adjustment of the modulator voltage is then resumed, with a next iteration at time C requiring an additional voltage $\Delta V_C$ to maintain the target photodetector voltage of $V_0$. The interval between times B and C, when continuous adjustment of the modulator voltage is interrupted, has been exaggerated in the drawing for convenience of illustration.

Figure 5:
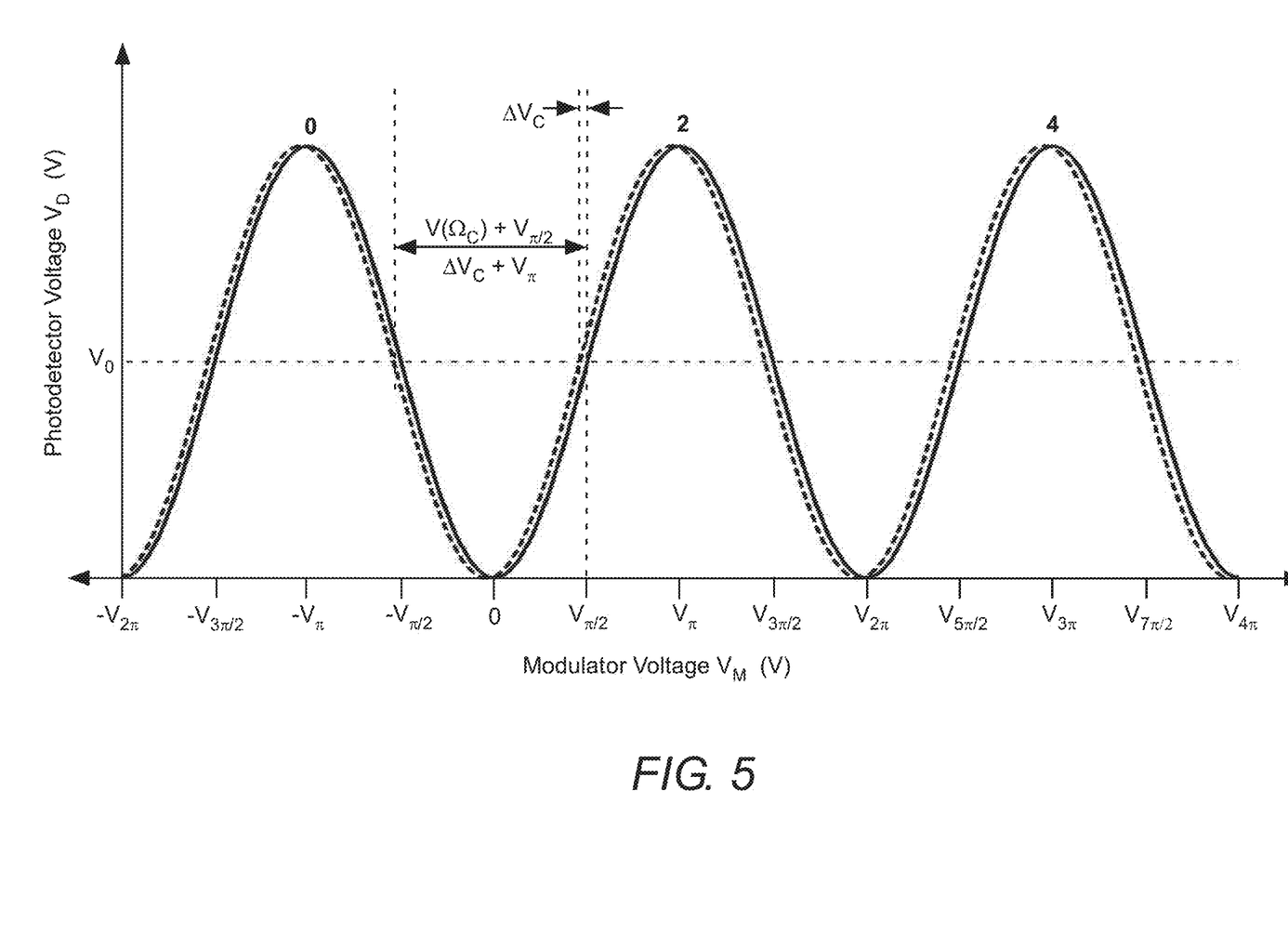
FIG. 5 is a graph schematically illustrating photodetector voltage vs. modulator voltage during operation of a fiber optic gyroscope in accordance with the method of FIGS. 3A and 3B, the solid line depicting closed-loop operation at a rotation rate $\Omega_C$.

FIG. 5 is a graph schematically illustrating photodetector voltage vs. modulator voltage at time C. The fiber optic gyroscope has a rotational velocity of $\Omega_C$, which would produce a displacement of the interference fringes by a voltage $V(\Omega_C)$, but this displacement is offset by an additional voltage $\Delta V_C$ applied to the modulator to maintain the target photodetector voltage of $V_0$.

Resetting the modulator voltage between times B and C allows operation of the fiber optic gyroscope to shift from fringe 0-1 to fringe 1-2. Vertical dashed lines indicate the overall displacement of the interference fringes from non-rotation at time A. The overall displacement at time C corresponds to a voltage of $\Delta V_C + V_\pi$ or equivalently a voltage of $V(\Omega_C) + V_{\pi/2}$. Voltage $V(\Omega_C) = \Delta V_C + V_{\pi/2}$ is proportional to the rotation rate $\Omega_C$ of the fiber optic gyroscope. During a period $T_2$ indicated on FIG. 3B, the additional voltage $\Delta V$ is applied iteratively to the modulator to maintain the target photodetector voltage of $V_0$ and thereby maintain operation on fringe 1-2. It should be noted that during period $T_1$ the photodetector voltage had a negative slope with-respect-to changes in modulator voltage, whereas during period $T_2$ the photodetector voltage has a positive slope with-respect-to changes in modulator voltage, due to operation on the different respective fringes.

Figure 6:
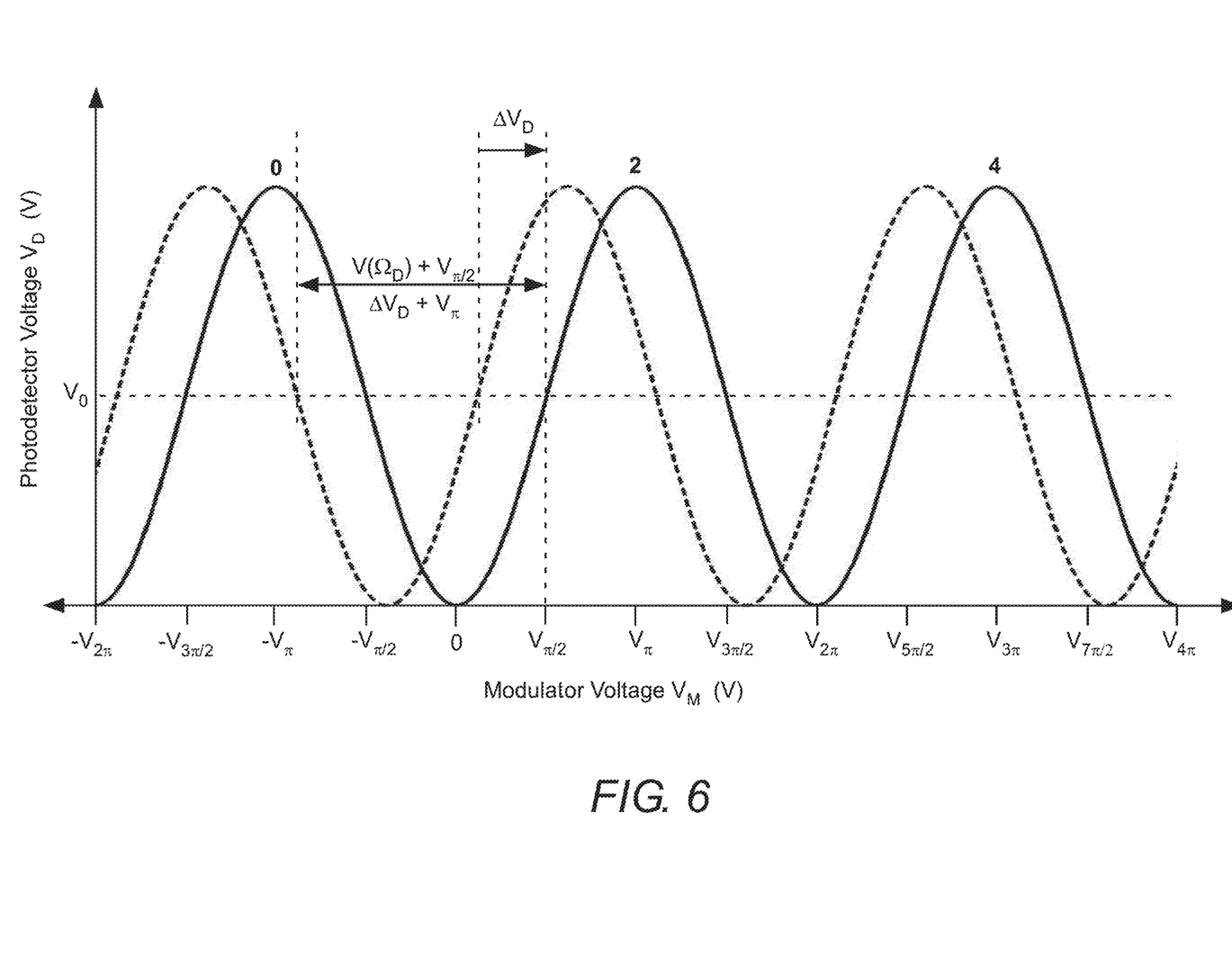
FIG. 6 is a graph schematically illustrating photodetector voltage vs. modulator voltage during operation of a fiber optic gyroscope in accordance with the method of FIGS. 3A and 3B, the solid line depicting closed-loop operation at a rotation rate $\Omega_D$.

FIG. 6 is a graph schematically illustrating photodetector voltage vs. modulator voltage at time D. The fiber optic gyroscope has a rotational velocity of $\Omega_D$, which would produce a displacement of the interference fringes by a voltage $V(\Omega_D)$, but this displacement is offset by an additional voltage $\Delta V_D$ applied to the modulator to maintain a photodetector voltage of $V_0$. During period $T_2$, the voltage $\Delta V + V_{\pi/2}$ is proportional to the rotation rate of the fiber optic gyroscope. Again, the constant of proportionality is known from the calibration procedure. Time D is the first iteration on fringe 1-2 to exceed the high-threshold voltage $V_{HT}$. Again, continuous adjustment of the modulator voltage is interrupted and the modulator voltage is rapidly set to $V_{\pi/2}$, as represented by an arrow on FIG. 3B between times D and E. Then continuous adjustment of the modulator voltage is resumed, for a next iteration at time E, with the fiber optic gyroscope operating on fringe 2-3.

By repeating the sequence of continuously adjusting the modulator voltage to maintain a target photodetector voltage of $V_0$, reaching a high-threshold voltage, adjusting the modulator voltage to $V_{\pi/2}$, and resuming the continuously adjusting on a higher-number fringe, the fiber optic gyroscope can operate on successively higher-order fringes. Such a sequence enables a many-fold extension of the dynamic range of the fiber optic gyroscope, without fundamental changes to the apparatus and without compromising rotational sensitivity.

The exemplary fiber optic gyroscope used in the method illustrated in FIGS. 4-6 has a long coherence time. In the case of a fiber optic gyroscope having a shorter coherence time, the extension of the dynamic range will be limited as the contrast between brighter constructive and darker destructive interference fringes at higher orders becomes comparable to noise on the photodetector signal. For shorter coherence times, parameters relating changes in photodetector signal to changes in rotation rate will be different from fringe-to-fringe. However, these different parameters would still be determined through a calibration procedure.

The example presented in FIGS. 3A-3B has positive rotational acceleration from a non-rotating state. The inventive method of operating a fiber optic gyroscope works similarly for negative rotational acceleration, with modulator voltages below the low-threshold voltage triggering an adjustment of the modulator voltage to $V_{\pi/2}$ and then a resumption of continuously adjusting the modulator voltage on a lower-number fringe. The fiber optic gyroscope thereby accurately determines a current rotation rate after any rotational acceleration or deceleration, in either rotational direction, limited ultimately by the length of the fiber coil. In order to handle arbitrary accelerations and decelerations for varying lengths of time, while utilizing the extended dynamic range accessible with the inventive method, it is necessary throughout to maintain a count of the interference fringe the fiber optic gyroscope is currently operating on.

In the example provided in FIGS. 3A-6, the modulator voltage is reset to $V_{\pi/2}$ every time a threshold voltage is reached. However, it would be sufficient to reset to a modulator voltage that is about $V_{\pi/2}$ to operate the fiber optic gyroscope on the next interference fringe. Here, "about $V_{\pi/2}$" means within a range $V_{3\pi/8}$ to $V_{5\pi/8}$, and more preferably within a range $V_{7\pi/16}$ to $V_{9\pi/16}$.

Those skilled in the art would recognize from the description herein that the inventive method could be configured to operate with modulator voltages between 0 and $-V_\pi$, without departing from the spirit and scope of the present invention. In this configuration, the modulator voltage would be set to about $-V_{\pi/2}$ every time a threshold voltage is reached. Equivalently, a relative phase of about $-\pi/2$ or about $\pi/2$ between the recombined beams interfering on the photodetector can be selected, which corresponds to a modulator voltage of about $-V_{\pi/2}$ or about $V_{\pi/2}$, respectively.

In another preferred embodiment of the present invention, the high-threshold and low-threshold voltages could be photodetector voltages, instead of modulator voltages. FIG. 2 shows there is a fixed relationship between photodetector voltage and modulator voltage for each phase of the interference fringes. In the case of a fiber optic gyroscope having a shorter coherence time, these threshold voltages would be different from fringe-to-fringe.

A more-complex and more-precise "closed-loop" method for operating a fiber optic gyroscope is by two-state modulation. For any fiber coil, there is a time $\tau$ for a beam of optical radiation to transit from end-to-end through the fiber coil, with a corresponding Eigen-frequency $$\frac{1}{2\tau}.$$

Two-state modulation alternates the modulator voltage between $V_{\pi/4}$ and $-V_{\pi/4}$ at half the Eigen-frequency $$\frac{1}{\tau}.$$

An overall modulation (equivalent to $V_{\pi/2}$ and $-V_{\pi/2}$ in the simplest implementation described herein above) is induced by the optical beam passing through the modulator both before and after transit through the fiber coil. Two photodetector voltages corresponding to the two respective modulation voltages are extracted by demodulating the photodetector signal. An additional voltage is applied to both the modulator voltages and is continually adjusted to null any difference between the two demodulated photodetector voltages. This common additional voltage is effectively the modulator voltage required to offset displacement of the interference fringes caused by rotation of the fiber optic gyroscope. The rotation rate of the fiber optic gyroscope is therefore determined from this common additional voltage, similar to the "open-loop" method described above.

The term "closed loop" derives from this continuous nulling of the difference between the two demodulated photodiode voltages. Two-state modulation is well known in the art and further description thereof is not necessary for understanding the principles of the present invention. In the description herein below, open loop and closed loop (without quotation marks) will be used with their common meanings, referring to open-loop and closed-loop control.

The present invention can be applied to two-state modulation, to extend the dynamic range of the fiber optic gyroscope. Closed-loop operation is interrupted when one of the two modulation voltages reaches a high-threshold voltage or low-threshold voltage. Equivalently, the closed-loop operation is interrupted when the common additional voltage reaches a high or low threshold. During a short period of open-loop operation, the common additional voltage is set to zero, then closed-loop operation is resumed by again alternating the modulator voltage between $V_{\pi/4}$ and $-V_{\pi/4}$. These are the voltages correspond to relative phases between the recombined beams interfering on the photodetector of $\pi/2$ and $-\pi/2$ when the gyroscope is not rotating.

Open-loop operation to reset the modulation voltages can be achieved in a time corresponding to one or two modulation cycles ($2\tau$ or $4\tau$) and effectively shifts the closed-loop operation onto a next interference fringe. The closed-loop control logic is reversed between operating closed loop on one fringe and operating closed loop on a next interference fringe. Specifically, the sign of the common additional voltage required to null the photodiode voltages reverses. This sequential reversal of logic from fringe-to-fringe would be handled by controller 22.

Two-state modulation requires a controller that synchronizes the closed-loop modulation and demodulation, nulls the photodiode voltages, and provides a calibrated or uncalibrated rotation rate as an output. The controller could be implemented entirely in electronic hardware or could include general purpose elements that are programmed. In the present invention, the controller would maintain a count of the interference fringe the fiber optic gyroscope is currently operating on, would control transitions between closed-loop and open-loop operation, and would apply the closed-loop logic required to operate on successive interference fringes. For a fiber optic gyroscope having a shorter coherence time, the controller would also apply parameters relating changes in detector signal to changes in rotation rate during closed-loop operation, which would be different for each interference fringe. Also, for a shorter coherence time, the controller would apply different threshold voltages for each interference fringe.

One implementation of a controller is to assign operation to three sub-controllers: for closed-loop operation, for open-loop operation, and for closed-loop operation with reversed logic. The high-threshold voltage and low-threshold voltage are essentially triggers for switching operation sequentially from sub-controller to sub-controller. During rotational acceleration, a repeating sequence would be: a first closed-loop sub-controller, an open-loop sub-controller, and a second closed-loop sub-controller.

In applications having periods of steady rotational acceleration and steady rotational deceleration, such a switching controller could anticipate approximately a rotation rate for a next modulation cycle from the current rate of rotational acceleration or deceleration. Equivalently, the controller could anticipate approximately a value for the common additional voltage for the next modulation cycle. By anticipating when to switch to open-loop control, the high-threshold voltage could be set up to $V_\pi$ and the low-threshold voltage could be set down to $-V_\pi$, thereby delaying switching from closed-loop control to open-loop control.

Returning to FIG. 1, fiber coil 18 preferably has a length in a range of about 100 meters (m) to about 10,000 m, most preferably in a range of about 500 m to about 2,000 m. The fiber coil of an exemplary fiber optic gyroscope has a core refractive index of about 1.33, a length of about 1,500 m, an Eigen-frequency of about 150 kilohertz (kHz), a transit time of about 7 microseconds, and is modulated at a frequency of about 75 kHz. The optical fiber is wound in coils having diameters from 38 to 56 millimeters. The exemplary fiber optic gyroscope has a super luminescent diode as a source of optical radiation, having a wavelength of about 1,556 nanometers (nm), a full-width-at-half-maximum spectral width of about 67 nm, and a corresponding coherence length of about 24 micrometers.

The inventors tested the exemplary fiber optic gyroscope, operated by two-state modulation, having a conventional dynamic range of 190 degrees per second (°/s). Here, "conventional dynamic range" means the range for closed-loop operation on just a zero-order fringe and without open-loop operation to reset the modulation voltages. By operating the fiber optic gyroscope using the method of the present invention, the inventors found the dynamic range could be extended above 2000°/s in one direction. It was calculated that up to 15 bright fringes are accessible in each direction, meaning the dynamic range could be extended by a factor of 30 or to at least 5700°/s in each direction. A long-term drift of between 0.001 and 0.01 degrees per hour is achievable over this extended dynamic range.

The present invention is described above in terms of a preferred embodiment and other embodiments. The invention is not limited, however, to the embodiments described and depicted herein. Rather, the invention is limited only by the claims appended hereto.

What is claimed is:

1. A method of operating a fiber optic gyroscope having a source of optical radiation, a fiber coil, and a photodetector all optically coupled to a modulator, the method comprising:
   energizing said source to generate a beam of optical radiation, said modulator arranged to divide said beam into two counter-propagating beams circulating around said fiber coil, said modulator recombining said counter-propagating beams after circulating completely around said fiber coil, said photodetector arranged to intercept said recombined beams, said photodetector generating a photodetector voltage that is proportional to an optical power of said recombined beams interfering on said photodetector;
   supplying a modulator control voltage to said modulator that changes a relative phase between said interfering beams;
   adjusting continuously said modulator control voltage to maintain a target photodetector voltage, said target photodetector voltage corresponding to a selected relative phase when said gyroscope is not rotating, thereby maintaining closed-loop operation on one interference fringe of said gyroscope as said gyroscope rotates, while providing an output that is a rotation rate of said gyroscope determined from said modulator control voltage;
   interrupting said adjusting-continuously step when said modulator control voltage reaches a threshold voltage due to rotational acceleration or deceleration of said gyroscope;
   setting said modulator control voltage to a voltage that corresponds to said selected relative phase when said gyroscope is not rotating; and
   resuming said adjusting-continuously step, thereby resuming closed-loop operation on another interference fringe of said gyroscope.

2. The method of claim 1, wherein said source of optical radiation is a laser diode generating laser radiation.

3. The method of claim 1, wherein said source of optical radiation is a super-luminescent diode.

4. The method of claim 1, wherein said photodetector is a photodiode.

5. The method of claim 1, wherein a controller receives said photodetector voltage, adjusts said modulator control voltage, and provides said output that is a rotation rate of said gyroscope.

6. The method of claim 1, wherein said modulator control voltage reaches a high-threshold voltage in said interrupting step and said closed-loop operation resumes on a higher-number fringe in said resuming step.

7. The method of claim 1, wherein said modulator control voltage reaches a low-threshold voltage in said interrupting step and said closed-loop operation resumes on a lower-number fringe in said resuming step.

8. The method of claim 1, wherein said threshold voltage is a modulator control voltage.

9. The method of claim 1, wherein said threshold voltage is a photodetector voltage.

10. The method of claim 1, wherein said selected relative phase is about $\pi/2$.

11. The method of claim 1, wherein said selected relative phase is about $-\pi/2$.

12. A method of operating a fiber optic gyroscope having a source of optical radiation, a fiber coil, and a photodetector all optically coupled to a modulator, the method comprising:
   energizing said source to generate a beam of optical radiation, said modulator arranged to divide said beam into two counter-propagating beams circulating around said fiber coil, said modulator recombining said counter-propagating beams after circulating completely around said fiber coil, said photodetector arranged to intercept said recombined beams, said photodetector generating a photodetector voltage that is proportional to an optical power of said recombined beams interfering on said photodetector;
   supplying a modulator control voltage to said modulator that changes a relative phase between said interfering beams;
   modulating said modulator control voltage alternately between two modulation voltages that correspond to relative phases of $\pi/2$ and $-\pi/2$ when said gyroscope is not rotating;
   adjusting continuously a common additional modulator voltage applied to said two modulation voltages, to null a difference between two corresponding demodulated photodetector voltages as said gyroscope rotates, while providing an output that is a rotation rate of said gyroscope determined from said common additional modulator voltage;
   interrupting said adjusting-continuously step when said common additional modulator voltage reaches a threshold voltage due to rotational acceleration or deceleration of said gyroscope;
   setting said common additional modulator voltage to zero; and
   resuming said adjusting-continuously step on a next interference fringe.

13. The method of claim 12, wherein said modulator control voltage is modulated at half an Eigen-frequency of said fiber coil.

14. The method of claim 12, wherein said adjusting-continuously step is interrupted for a time corresponding to one or two modulation cycles.

15. The method of claim 12, wherein said source of optical radiation is a laser diode generating laser radiation.

16. The method of claim 12, wherein said source of optical radiation is a super-luminescent diode.

17. The method of claim 12, wherein a controller receives said photodetector voltage, modulates said modulator control voltage, adjusts said common additional modulator voltage, and provides said output that is a rotation rate of said gyroscope.

18. The method of claim 17, wherein said controller assigns operation to three sub controllers, for closed-loop operation on alternating interference fringes during said adjusting-continuously step, for open-loop operation during said interrupting and setting steps, and for closed-loop operation on other interference fringes during said adjusting-continuously step.

19. The method of claim 18, wherein said controller anticipates a value of said common additional modulator voltage for a next modulation cycle.

\* \* \* \* \*